(12) United States Patent
Fürholzer

(10) Patent No.: US 8,310,834 B2
(45) Date of Patent: Nov. 13, 2012

(54) MODULE WITH HOUSING FOR MOUNTING RAIL

(75) Inventor: Roland Fürholzer, Amberg (DE)

(73) Assignee: Siemens Aktiengesellschaft, München (DE)

( * ) Notice: Subject to any disclaimer, the term of this patent is extended or adjusted under 35 U.S.C. 154(b) by 342 days.

(21) Appl. No.: 12/628,433

(22) Filed: Dec. 1, 2009

(65) Prior Publication Data

US 2010/0134987 A1 Jun. 3, 2010

(30) Foreign Application Priority Data

Dec. 2, 2008 (EP) .................................. 08020911

(51) Int. Cl.
*H05K 7/00* (2006.01)

(52) U.S. Cl. ........................................................ 361/747

(58) Field of Classification Search .................. 361/726, 361/729, 747, 756, 759, 801, 802, 807, 809, 361/810

See application file for complete search history.

(56) References Cited

U.S. PATENT DOCUMENTS

| | | | |
|---|---|---|---|
| 4,996,631 A * | 2/1991 | Freehauf .......................... 361/798 |
| 6,172,880 B1 * | 1/2001 | Petitpierre et al. ............. 361/801 |
| 6,208,514 B1 * | 3/2001 | Stark et al. ..................... 361/704 |
| 6,220,879 B1 * | 4/2001 | Ulrich ............................ 439/160 |
| 6,388,884 B1 * | 5/2002 | Greco et al. .................... 361/754 |
| 6,515,855 B1 * | 2/2003 | Removedummy ....... 361/679.33 |
| 6,637,719 B2 * | 10/2003 | Jiang ............................... 248/682 |
| 6,741,479 B2 * | 5/2004 | Korber et al. .................. 361/801 |
| 6,915,562 B2 * | 7/2005 | Joist et al. ......................... 29/758 |
| 7,016,199 B2 * | 3/2006 | Burgers et al. ................. 361/801 |
| 7,130,199 B2 * | 10/2006 | Koerber et al. ................ 361/754 |
| 7,203,067 B2 * | 4/2007 | Beall et al. ..................... 361/726 |
| 7,292,456 B2 * | 11/2007 | Leung et al. ................... 361/798 |
| 7,408,788 B2 * | 8/2008 | Rubenstein .................... 361/801 |
| 7,417,866 B1 * | 8/2008 | Beseth et al. .................. 361/732 |
| 7,477,525 B2 * | 1/2009 | Coutancier et al. ........... 361/801 |
| 2005/0041408 A1 * | 2/2005 | Burgers et al. ................ 361/801 |
| 2005/0117316 A1 * | 6/2005 | Wrycraft ........................ 361/802 |
| 2006/0215373 A1 * | 9/2006 | Joist et al. ...................... 361/726 |
| 2008/0013288 A1 * | 1/2008 | Karstens ........................ 361/726 |
| 2008/0174980 A1 * | 7/2008 | Krispin et al. ................. 361/809 |
| 2008/0310136 A1 * | 12/2008 | Huang ............................ 361/801 |

FOREIGN PATENT DOCUMENTS

| | | |
|---|---|---|
| DE | 10243383 B3 | 2/2004 |
| EP | 528341 B1 | 8/1992 |
| EP | 0740499 A1 | 10/1996 |

* cited by examiner

*Primary Examiner* — Lisa Lea Edmonds
*Assistant Examiner* — Xanthia C Cunningham

(57) ABSTRACT

A module and tensioning means for mounting the module to a mounting rail are provided. The tensioning means are rotatably disposed about a pivot point disposed on a housing, wherein the tensioning means interact with anchoring means such that, by rotation of the tensioning means, the anchoring means are latched to a second clamping means of the mounting rail.

12 Claims, 2 Drawing Sheets

MODULE WITH HOUSING FOR MOUNTING RAIL

CROSS REFERENCE TO RELATED APPLICATIONS

This application claims priority of European Patent Office Application No. 08020911.7 EP filed Dec. 2, 2008, which is incorporated by reference herein in its entirety.

FIELD OF INVENTION

The invention relates to a module with housing, comprising a first retaining means and a second retaining means for fixing on a mounting rail, the first retaining means being designed such that it can be connected in a form-fit manner to a first clamping means of the mounting rail, the second retaining means having a tensioning means and an anchoring means.

BACKGROUND OF INVENTION

For assembling e.g. electronic systems, depending on the application, a greater or lesser number of modules are attached or fastened e.g. side by side to a mounting rail fixed inside a control cabinet, for example. Here a top edge of the module is first clipped over and the lower edge of the module is latched to the mounting rail by a swiveling movement, thereby securing said module in its final position. Such a module is disclosed in EP 0 740 499 A1.

During positioning of the modules, the modules are contacted to one another via a backplane or via connecting terminals or other such means. To ensure that all the contacts are maintained even under industrial conditions such as vibration, impact, dust, heat, cold, etc., a reliable fixing system is required. When a module is clipped to a mounting rail by means of a snap-on hook, it is disadvantageous that the snap-on hook, in order to ensure its rear latching functionality, has to have a degree of play between a lug and the mounting rail. If this play is not present, the snap-on mechanism will not work. However, as result of this play, in the case of a correctly dimensioned snap-on hook there is insufficient contact pressure between the module and the mounting rail in the latched state, which is undesirable for use under industrial conditions.

A solution using a retaining arm as disclosed in DE 102 43 383 B3 also has this drawback.

Even in a solution in which a screwed connection is used instead of the snap-on hook, it is disadvantageous that several full turns are necessary for actuating the screw and the fitter requires more time for assembly.

EP 0 528 341 B1 discloses a device for detachably fixing an apparatus housing to a mounting rail. With this device, a locking part is coupled to a clamping part such that a distance between the two sections can be changed by sliding the locking part into at least two positions, and that in one of said positions the clamping part is locked by the locking part such that it cannot be pushed into the opening position for detaching the apparatus housing from the mounting rail. Although this creates a device of relatively simple design, said device providing an easily detachable fixing for the housing, contact pressure between the module and the mounting rail cannot be achieved with this device.

SUMMARY OF INVENTION

An object of the invention is to provide a module with housing for a mounting rail which exhibits a higher contact pressure compared to the devices known from the prior art.

This object is achieved for the module mentioned in the introduction comprising the tensioning means and the anchoring means by disposing the tensioning means such that it rotates about a pivot point disposed on the housing, the tensioning means interacting with the anchoring means such that, by rotational movement of the tensioning means, the anchoring means can be latched to a second clamping means of the mounting rail, said anchoring means having a guiding means which is in engagement with a guiding point disposed on the housing, and the guiding means being implemented as a link guide with a curved run for controlling the movement of the anchoring means. The module is inserted, for example, by its first retaining means, which can be disposed on an underside of the module, into or onto a first clamping means of the mounting rail and guided to the mounting rail by a swiveling movement so that a second retaining means of the module latches with a second clamping means of the mounting rail, the second clamping means possibly being a top edge of the mounting rail. The second retaining means is here designed as a mechanism comprising a tensioning means and an anchoring means, the anchoring means being able to hook onto the top edge of the mounting rail and the anchoring means being able to be tensioned by means of the tensioning means, enabling the module to be pressed with a degree of force against the mounting rail.

Said guiding means is to be regarded as a kind of template which predefines how the anchoring means is guided when the tensioning means is moved to secure the module by means of the anchoring means. When a module is swiveled inward to a mounting rail, the anchoring means is preferably placed such that it does not impede the swiveling-in of the module to the mounting rail. This requires that the anchoring means is preferably positioned in an elevated position relative to the top edge of the mounting rail. In the swiveled-in state of the module on the mounting rail, the anchoring means must undergo a downward movement in order to fix said anchoring means to the mounting rail. This downward movement is preferably achieved by the guiding means.

This curved run is adapted such that an optimum line of motion for controlling the movement of the anchoring means is achieved.

This link guide or link for short preferably has a slot, a bar or a groove, in/on which a link block is bilaterally guided in a constrained manner in order to translate motion of the link into motion of the link block or vice versa. A transfer function of the link guide is here preferably determined by the shape of the slot, bar or groove and is to a large extent freely selectable.

In a further-optimized embodiment, the anchoring means and the tensioning means form an interlock device with a toggle joint. The tensioning means as a rotatable articulation part about the pivot point, preferably implemented with a tensioning frame, ensures, e.g. by finger actuation, the necessary movement and the required force of the anchoring means for pressing the module against the mounting rail.

In a possible embodiment, the tensioning means is implemented with a bearing bush for accommodating a first shaft stub of the housing. The tensioning means as part of the toggle joint is preferably pivot-mounted via a bearing bush recessed into the tensioning means, into which bearing bush a shaft stub of the housing extends, in order to implement the rotary motion.

It is further advantageous here that the tensioning means has a stop for limiting the rotation. The stop can be mounted on the tensioning means such that a maximum force transmitted via the anchoring means to the mounting rail is not exceeded, said stop being implemented, for example, as a folded-over edge of the tensioning means which strikes against the anchoring means and thus impedes rotation of the tensioning means.

In order to prevent the anchoring means from slipping off the top edge of the mounting rail, the anchoring means is preferably provided with an arcuate tensioning claw. It is also conceivable for the arcuate tensioning claw to be made an integral part of the anchoring means and e.g. as a stamped sheet metal part.

It is also advantageous if the guiding means is designed to implement a superimposed movement of the anchoring means, resulting from a downward movement and a forward movement, from an initial position to an interlock position. With this design it is preferably possible that, when the tensioning means is rotated in the direction of the mounting rail, the tensioning claw is first moved essentially downward at its tip so that it engages the mounting rail, whereupon the tensioning claw can be tensioned by the tensioning means, thereby producing the necessary contact pressure between module and mounting rail.

In the last part of the motion in said superimposed movement, the toggle joint overcomes an apex. The module is now secured to the mounting rail and cannot by itself become detached from mounting rail.

For process automation, a module according to the above-mentioned designs is preferably employed for use in the industrial environment, in particular an automation component, with a fixing mechanism ensuring a high contact pressure.

For mounting the module, it is found to be particularly practical that the rotation of the tensioning means that can be imparted to interlock the module can be imparted in the same direction as the inward swiveling movement. If the swiveling direction and the rotation direction of the tensioning frame, i.e. the pressure applied to the tensioning frame, run in the same direction, the module can be swiveled inward and fixed to the rail in one operation.

BRIEF DESCRIPTION OF THE DRAWINGS

An exemplary embodiment and further features of the invention are illustrated in the accompanying drawings in which.

DETAILED DESCRIPTION OF INVENTION

Figure 1:
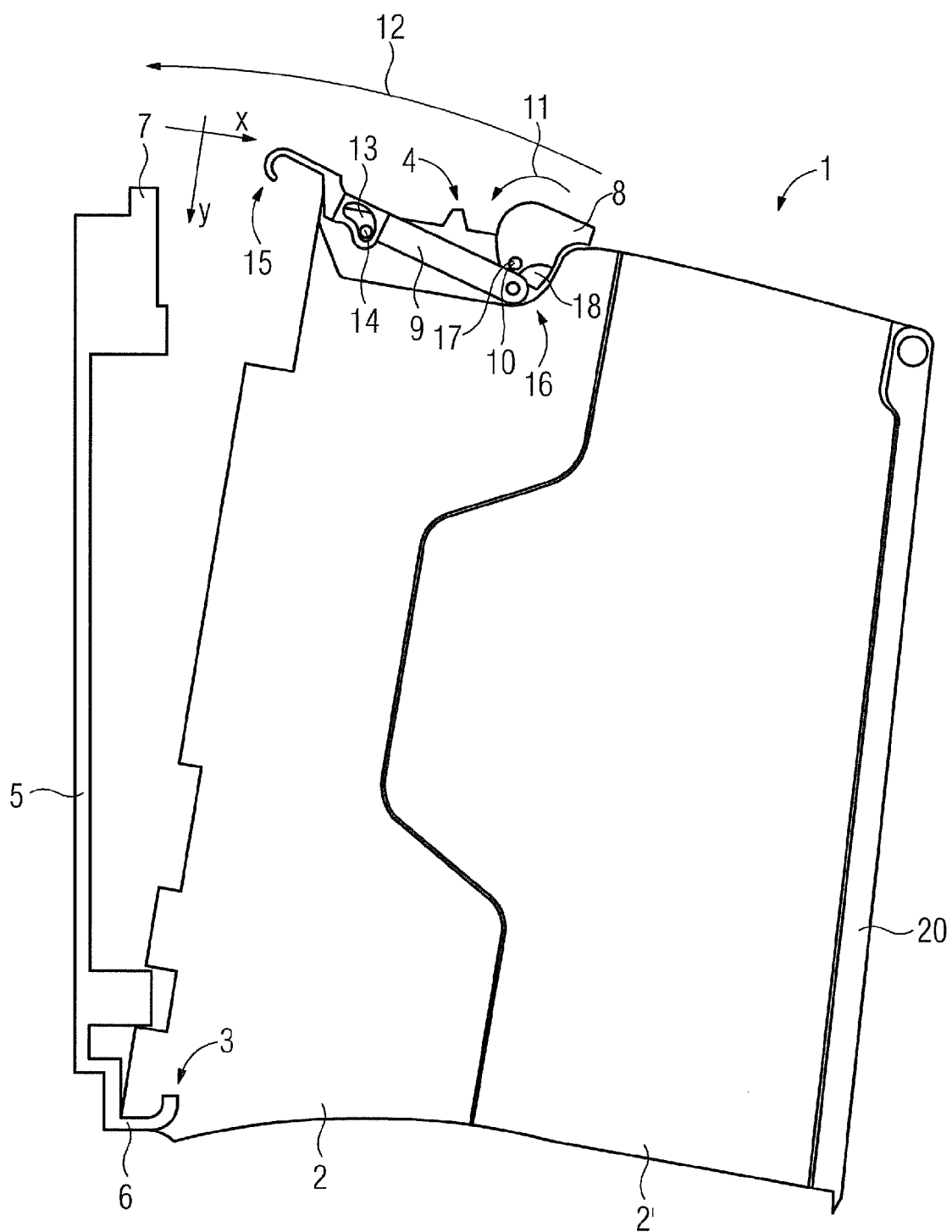
FIG. 1 shows a side view of a module being swiveled inward to a mounting rail and FIG. 2 shows a perspective view of a module on a mounting rail.

FIG. 1 shows a module 1 with a housing 2 being swiveled inward to a mounting rail 5. The module 1 is inserted by its bottom edge into a first clamping means 6 of the mounting rail 5, the first clamping means 6 of the mounting rail 5 being implemented as an arcuate projection. A first retaining means 3 of the module 1 can be inserted into said arcuate projection. The first retaining means 3 is implemented as an in/out molding of the external housing 2 of the module 1. The inward swiveling movement 12 to be performed from this position is indicated by a directional arrow. The module 1 is pressed against the mounting rail 5 by said inward swiveling movement 12. This movement is usually imparted by hand or finger pressure exerted by the relevant fitter.

In order to fix the module to the mounting rail 5 with a second retaining means 4, said second retaining means 4 has a tensioning means 8 and an anchoring means 9, said tensioning means 8 being rotatably disposed about a pivot point 10 disposed on the housing 2. The pivot point 10 is here implemented as a first shaft stub. The first shaft stub is realized as a bump in the circumferential surface of the housing 2. The tensioning means 8 interacts with the anchoring means 9 such that, by rotation 11 of the tensioning means 8, the anchoring means 9 can be latched with a second clamping means 7 of the mounting rail 5. The second clamping means 7 of the mounting rail is implemented as a top edge of the mounting rail.

The anchoring means 9 has a guiding means 13 which is in engagement with a guiding point 14 disposed on the housing 2, said guiding point 14 being disposed on the housing 2 as a second shaft stub, similarly to the pivot point 10. The guiding means 13 has a link guide with a curved run for controlling the x,y movement of the anchoring means 9.

To ensure that the retaining means 4 can hook in securely behind the second clamping means 7, the anchoring means 9 ends in an arcuate tensioning claw 15. If the tensioning claw 15 is in a position in which the module is pressed against the mounting rail, behind the second clamping means 7, the necessary tensioning force for pressing the module 1 against the mounting rail 5 is produced by the interlock device, implemented as a toggle joint 16 and formed by the anchoring means 9 and the tensioning means 8, by the rotation 11 of the tensioning means 8 in its function as a toggle joint 16. To ensure that the tensioning means 8 cannot be rotated beyond a maximum contact pressure, the tensioning means 8 has a stop 18. The tensioning means 8 is to be regarded as a stamped sheet metal part in which the stop 18 is formed by a folded-over tongue of said stamped sheet metal part and strikes the anchoring means 9 in an end position. By means of the guiding means 13 with its curved link guide run, the anchoring means 9 can execute a superimposed motion sequence by rotation 11 of the tensioning means 8. Said motion sequence consists of a forward movement in the X-direction x and a downward movement in the Y-direction y.

In addition to its housing 2, the module comprises another housing section 2', said other housing section 2' having a flap 20. As today's modules are usually also connected via contacts or rather contact panels, contact pins which are disposed on the back of the module, to connectors which are disposed in the mounting rail, the necessary contact pressure for secure contacting of the module with connectors in the mounting rail can be ensured by means of the second retaining means 4, i.e. the interlock mechanism comprising the anchoring means 9 and the tensioning means 8 which together form a toggle joint.

Figure 2:
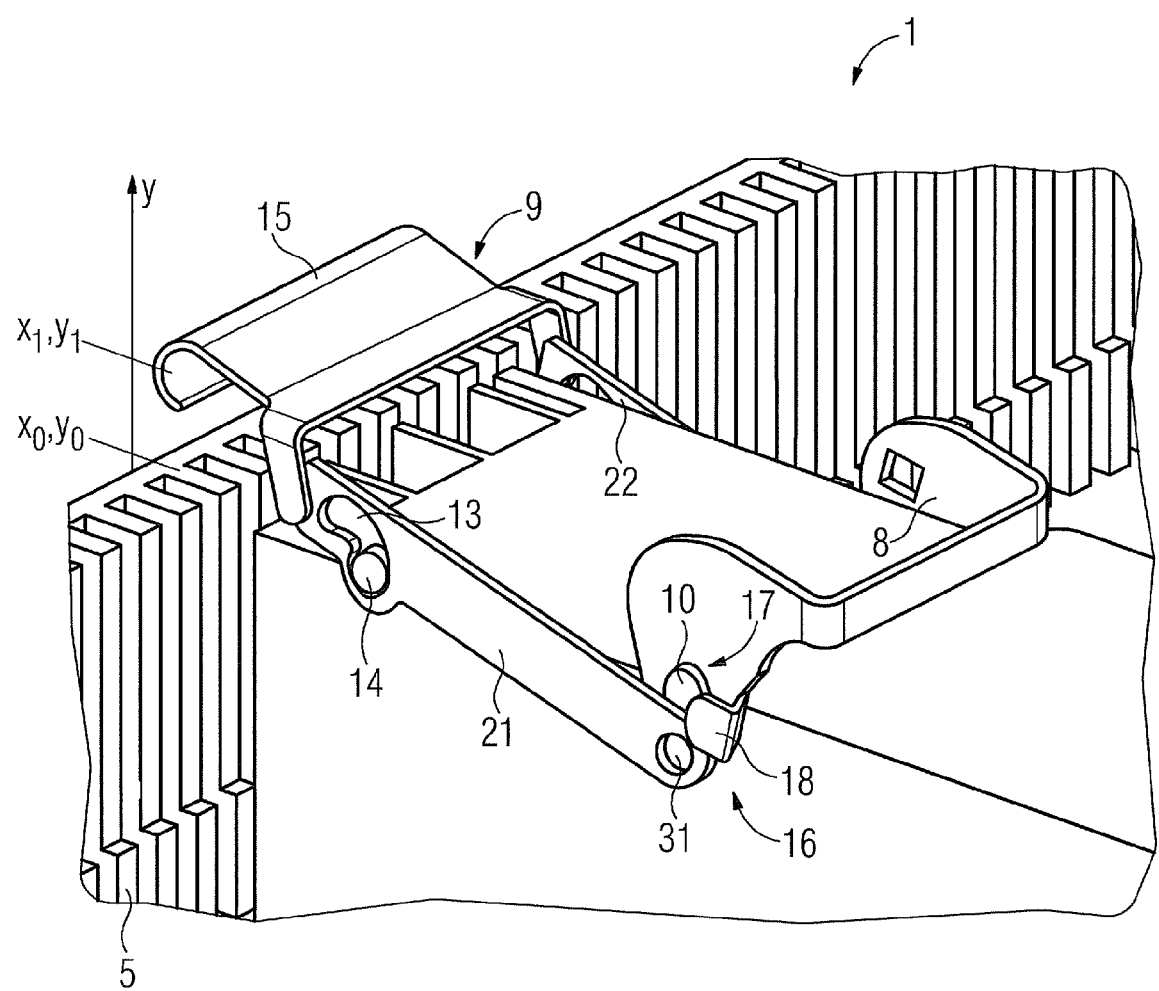

FIG. 2 shows a perspective detail view of the module 1 known from FIG. 1. The module 1 has already been swiveled inward to the mounting rail 5, the tensioning claw 15 is still in a free position $y_1$ with respect to the mounting rail 5. A fitter would now preferably have to apply finger pressure to the tensioning means 8 in order to fix the module 1, said tensioning means 8 having a tensioning frame to which the finger pressure is readily transmittable and causes the tensioning means 8 to rotate in the direction of the mounting rail 5. In this rotary motion, the tensioning means 8 pivots about the pivot point 10, said tensioning means 8 having a bearing bush 17 for reliable guiding about the pivot point 10. The tensioning means 8 has a first trunnion 31, said first trunnion 31 likewise being implemented as a shaft stub and extending into an opening of the anchoring means 9 to form the toggle joint. In addition to its tensioning claw 15, the second retaining means 4 is implemented with a first side piece 21 and a second side piece 22. The first and the second side piece 21,22 are connected to the tensioning claw 15 and form a U-shaped device, said U-shaped device being guidable via the guiding means 13 on the module 1. The guiding means 13 are each recessed into the first side piece 21 and the second side piece 22 as a curvilinear link guide. By means of the guiding point 14, which is implemented as a shaft stub in the housing 2, the anchoring means 9 can be guided in a predefined x- and y-direction by the template-like runs recessed in the side pieces 21,22.

Pressing on the tensioning frame of the tensioning means 8 initiates a rotation 11 wherein the side pieces 21 and 22 are caused to move forward in the x-direction via the trunnion 31. The tensioning claw 15 is simultaneously lowered in a downward direction y by means of the link guide. The tensioning claw 15 moves from an initial position $y_1, x_1$ to an interlock position $y_0, x_0$. In said interlock position $x_0, y_0$ the tensioning means 8 is pressed forward to its full extent, in the direction of the mounting rail 5, and the stop 18 lies against a top edge of the first side piece 21. As in the last part of the movement of the toggle joint 16 formed by the tensioning means 8 and the anchoring means 9 an apex is overcome, the fixing device can now exert maximum pressure on the mounting rail 5 via its tensioning claw 15, i.e. press the module 1 against the mounting rail 5. In this interlock position the module 1 is securely connected to the mounting rail 5 and can no longer become detached from the mounting rail 5 by itself.

In order to release the module 1 from the mounting rail 5 again, the tensioning frame of the tensioning means 8 must be lifted slightly e.g. with the aid of a screwdriver so that the toggle joint 16 can overcome its apex in the opposite direction. The interlock then reverts of its own accord to its initial position because of a preloading.

By means of the link guide and the resulting guidance of the tensioning claw, the latter remains defined in its movement. It cannot tilt away, nor does it therefore need to be aligned separately prior to fixing the module. This is a major advantage for assembly. The pressing movement required for interlocking that is exerted on the tensioning frame is exerted in the same direction as the inward swiveling of the module. A combination of pushing and pulling motion is not necessary. Tensile stress on the module greatly increases the tensioning force of the tensioning claw so that the system automatically regains its original position. It is also advantageous that less stringent requirements can be placed on the dimensional accuracy of the module housings and engagement throat, as any thickness differences can be compensated by the tensioning claw's elasticity.

The invention claimed is:

1. A module, comprising:
    a housing;
    a first retaining means for fixing to a mounting rail, the first retaining means being designed such that the retaining means is connectable in a form-fit manner to a first clamping means of the mounting rail;
    a second retaining means for fixing to the mounting rail, the second retaining means having a tensioning means and an anchoring means, the tensioning means being rotatably disposed about a pivot point disposed on the housing, wherein the tensioning means interacts with the anchoring means such that, by rotation of the tensioning means, the anchoring means is latched to a second clamping means of the mounting rail,
    wherein the anchoring means has a guiding means which is in engagement with a guiding point disposed on the housing, said guiding means including a curved run for controlling a movement of the anchoring means,
    wherein the tensioning means is implemented with a bearing bush for accommodating a first shaft stub of the housing.

2. The module as claimed in claim 1, wherein the anchoring means and the tensioning means form an interlock device comprising a toggle joint.

3. The module as claimed in claim 2, wherein the tensioning means has a stop for limiting the rotation.

4. The module as claimed in claim 2, wherein the anchoring means has an arcuate tensioning claw.

5. The module as claimed in claim 2, wherein the guiding means is designed to impart a superimposed movement of the anchoring means from an initial position to an interlock position, the movement comprising of a downward movement and a forward movement.

6. The module as claimed in claim 2, wherein the module is an automation component for use in an industrial environment, with a fixing mechanism ensuring a high contact pressure of the module against the mounting rail.

7. The module as claimed in claim 2, wherein the rotation of the tensioning means imparted to interlock the module is imparted in the same direction as the inward swiveling movement.

8. The module as claimed in claim 1, wherein the tensioning means has a stop for limiting the rotation.

9. The module as claimed in claim 1, wherein the anchoring means has an arcuate tensioning claw.

10. The module as claimed in claim 1, wherein the guiding means is designed to impart a superimposed movement of the anchoring means from an initial position to an interlock position, the movement comprising of a downward movement and a forward movement.

11. The module as claimed in claim 1, wherein the module is an automation component for use in an industrial environment, with a fixing mechanism ensuring a high contact pressure of the module against the mounting rail.

12. The module as claimed in claim 1, wherein the rotation of the tensioning means imparted to interlock the module is imparted in the same direction as the inward swiveling movement.

* * * * *